(12) United States Patent
Rodney

(10) Patent No.: US 8,505,934 B2
(45) Date of Patent: Aug. 13, 2013

(54) BLADE LIFT TOOL

(76) Inventor: Leach Rodney, Wichita, KS (US)

(*) Notice: Subject to any disclaimer, the term of this patent is extended or adjusted under 35 U.S.C. 154(b) by 0 days.

(21) Appl. No.: 13/415,785

(22) Filed: Mar. 8, 2012

(65) Prior Publication Data

US 2012/0228842 A1    Sep. 13, 2012

Related U.S. Application Data

(60) Provisional application No. 61/451,297, filed on Mar. 10, 2011.

(51) Int. Cl.
*B62B 1/06* (2006.01)
*B62B 1/04* (2006.01)
*B62B 1/02* (2006.01)

(52) U.S. Cl.
USPC .................................. 280/47.17; 280/47.131

(58) Field of Classification Search
USPC ............. 280/47.131, 47.17, 47.27; 29/281.1, 29/464; 269/900, 902, 909
See application file for complete search history.

(56) References Cited

U.S. PATENT DOCUMENTS

| | | | |
|---|---|---|---|
| 157,589 A | 12/1874 | Button | |
| 2,198,918 A | 4/1940 | Mercil | |
| 2,716,557 A | 8/1955 | Gould et al. | |
| 2,749,979 A * | 6/1956 | Prewett | 157/13 |
| 3,275,166 A * | 9/1966 | Shannon | 340/3.1 |
| 3,951,286 A | 4/1976 | Horst | |
| 4,033,595 A | 7/1977 | Mauch | |
| 4,065,013 A | 12/1977 | Orthman | |
| 4,637,769 A | 1/1987 | Thorndike | |
| 4,729,711 A | 3/1988 | Holopainen | |
| 4,752,173 A | 6/1988 | Fleming | |
| 5,428,851 A | 7/1995 | Shore et al. | |
| 5,433,464 A | 7/1995 | Hlebakos | |
| 5,474,313 A | 12/1995 | Marquardt et al. | |
| 5,489,109 A | 2/1996 | Murphy | |
| 5,624,224 A | 4/1997 | Brandenburg | |
| 5,681,139 A | 10/1997 | Szanto et al. | |
| 5,993,134 A | 11/1999 | Williamson | |
| 6,059,512 A | 5/2000 | Kielinski et al. | |
| 6,203,050 B1 * | 3/2001 | Stech | 280/507 |
| 6,357,063 B1 * | 3/2002 | Selby | 5/81.1 R |
| 6,474,930 B1 | 11/2002 | Simpson | |
| 6,557,869 B2 | 5/2003 | Gillette et al. | |
| 6,637,761 B1 | 10/2003 | Boettcher | |
| 6,840,730 B2 | 1/2005 | Noualy | |
| 6,921,095 B2 | 7/2005 | Middleby | |
| 7,500,682 B1 | 3/2009 | Del Marmol | |
| 2004/0057821 A1 | 3/2004 | Samis | |
| 2007/0277360 A1 * | 12/2007 | Pogorzelski et al. | 29/281.1 |
| 2009/0020369 A1 | 1/2009 | Warachka | |

* cited by examiner

*Primary Examiner* — J. Allen Shriver, II
*Assistant Examiner* — Bryan Evans
(74) *Attorney, Agent, or Firm* — Plager Schack LLP

(57) ABSTRACT

A motor grader blade lift tool comprises a handle mechanically coupled to a center riser. The center riser is further mechanically coupled to a bottom round tubing. The bottom round tubing is further mechanically coupled to a bottom bar square tubing. The bottom bar square tubing is mechanically coupled to a first blade stop and a second blade stop. The first blade stop is mechanically coupled to a first pin and the second blade stop is mechanically coupled to a second pin. The first pin and the second pin can fit through cavities on a motor grader blade to support the motor grader blade on the blade lift tool.

3 Claims, 2 Drawing Sheets

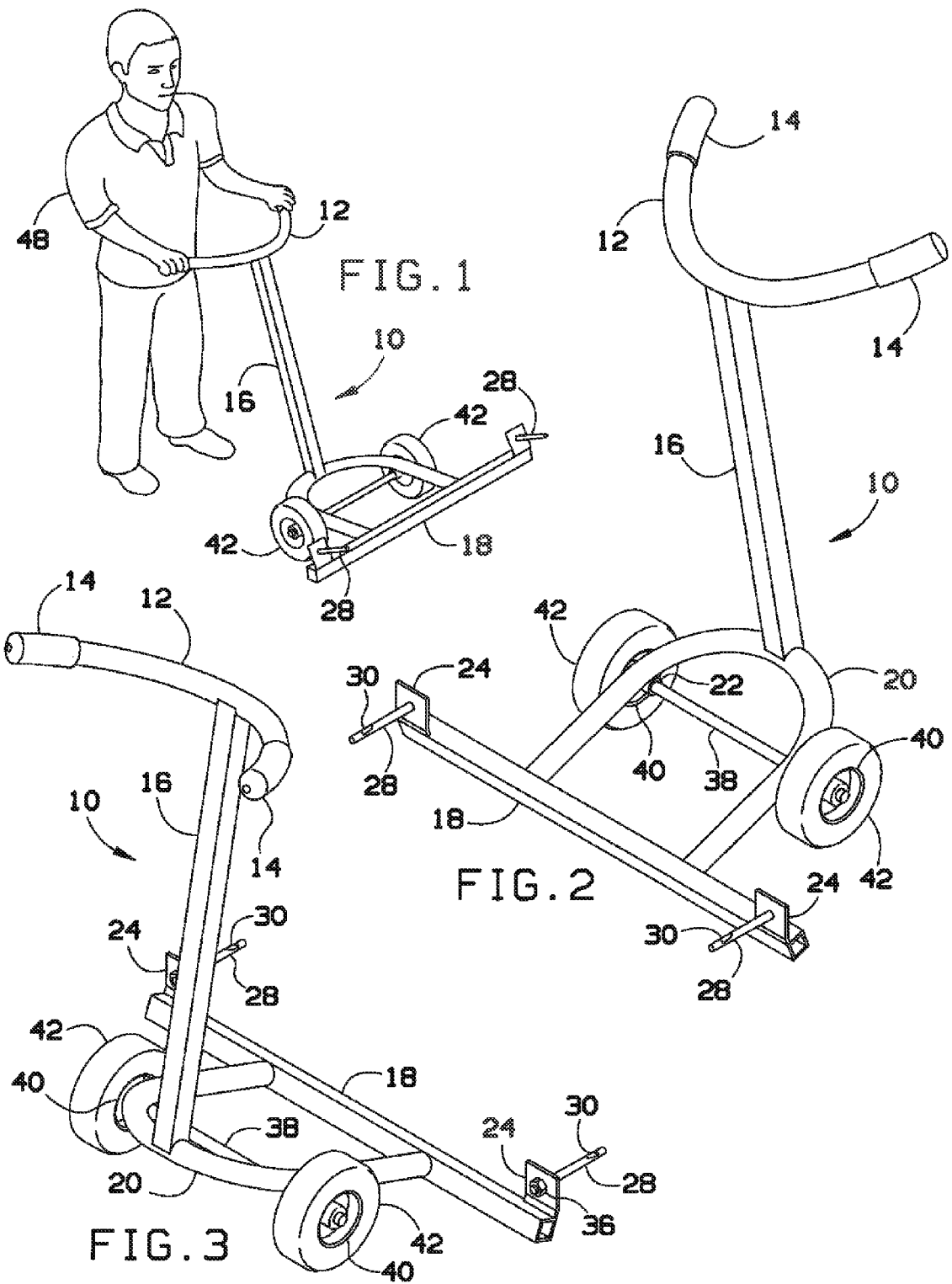

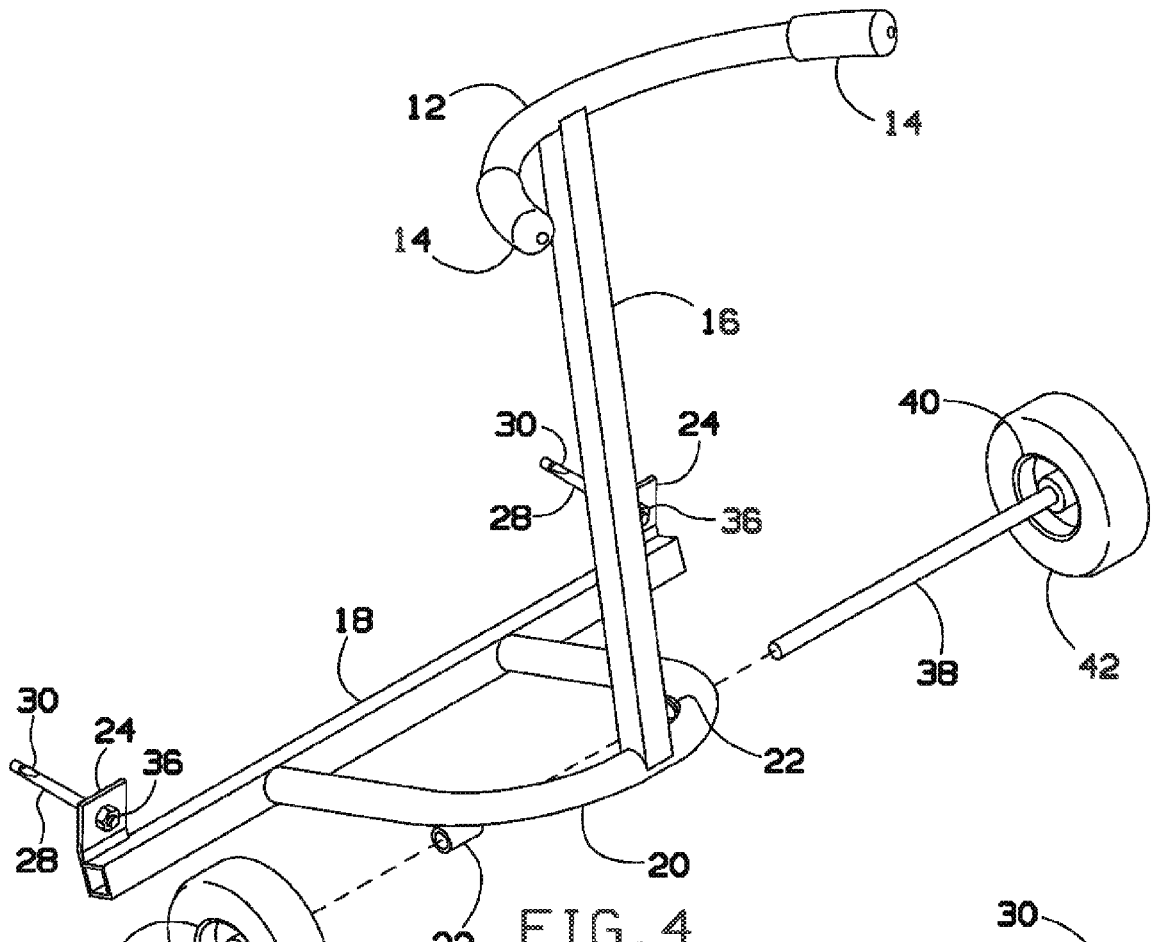
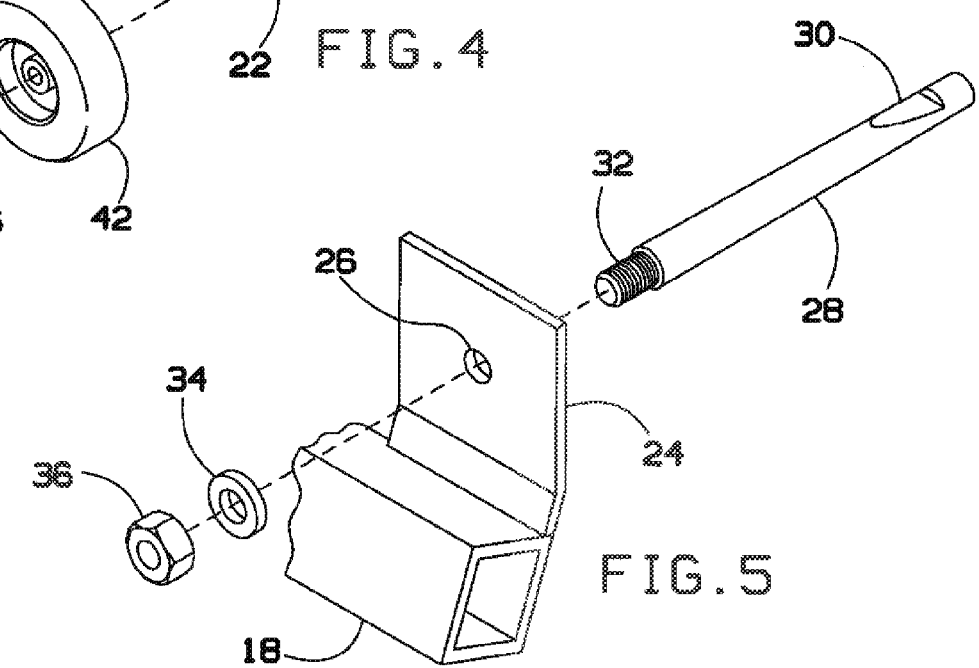

BLADE LIFT TOOL

CROSS REFERENCE TO RELATED APPLICATIONS

This application claims priority to Provisional Application 61/451,297 filed on Mar. 10, 2011.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION BY REFERENCE OF MATERIAL SUBMITTED ON A COMPACT DISC

Not Applicable

FIELD OF THE INVENTION

This invention relates to devices which can move heavy industrial equipment, in particular motor grader blades.

BACKGROUND OF THE INVENTION

Prior to the present invention, the primary way of moving a motor grader blade was to have two strong people lift it. This creates issues with training and handling situations where an individual is injured. As a result, McDermott (U.S. Pat. No. 5,071,183) invented a lift which can be attached to a crane to lift a motor grader blade. This invention succeeded in work places that had access to a crane and a licensed crane operator. More frequently, these additional facilities are not available or effective in smaller workplaces leading to the need for the present invention. Similarly, conventional hand trucks such as Williamson (U.S. Pat. No. 5,993,134) fail to provide the balance needed to move a motor grader blade which is taught in the present invention.

BRIEF SUMMARY OF THE INVENTION

The present invention includes methods, systems, and other means for a blade lift tool.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:
 FIG. 1: is a perspective view of the invention shown in use.
 FIG. 2: is a perspective view of the invention.
 FIG. 3: is a perspective view of the invention.
 FIG. 4: is an exploded perspective view of the invention.
 FIG. 5: is a detailed exploded perspective of the invention showing the pin and the blade stop.

DETAILED DESCRIPTION OF THE INVENTION

Embodiments of the present invention overcome many of the obstacles associated with moving a motor grader blade, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows the invention in use. User 48 desires to move a motor grinder blade with blade lift tool 10. Blade lift tool 10 comprises handle bar 12 (which is shown in more detail in FIG. 2-FIG. 4), which is mechanically coupled to center riser 16. Center riser 16 is mechanically coupled to bottom round tubing 20 (not shown) which is further mechanically coupled to first tire 42 and second tire 42 (which is shown in more detail in FIG. 4). Bottom round tubing 20 (not shown) is additionally mechanically coupled bottom bar square tubing 18. Bottom bar square tubing 18 is further mechanically coupled to first pin 28 and second pin 28 as shown in FIG. 5.

FIG. 2 shows a perspective view of blade lift tool 10 in more detail. As noted above, handle 12 is mechanically coupled to center riser 16 which is further mechanically coupled to bottom round tubing 20. Bottom round tubing 20 is mechanically coupled to bottom bar square tubing 18, Here, handle 12 further comprises safety grips 14. First tire 42 is mechanically coupled to first wheel 40 which is further mechanically coupled to axel 38. First wheel hub 22 can be mechanically coupled to axel 38 as shown in FIG. 4. Axel 38 is further mechanically coupled to second wheel hub 22 as shown in FIG. 4. Second wheel hub 22 is mechanically coupled to second tire 42 which is further mechanical coupled to second wheel 40 in a well-known manner.

FIG. 3 shows another perspective view of blade lift tool 10. As noted above, bottom round tubing 20 is mechanically coupled to bottom bar square tubing 18. Bottom bar square tubing 18 is mechanically coupled to first blade stop 24 which is mechanically coupled to first pin 28 with first nut 36 as shown in FIG. 5. Similarly, Bottom bar square tubing 18 is mechanically coupled to second blade stop 24 which is mechanically coupled to second pin 28 with second nut 36 as shown in FIG. 5. One novel feature of the device is first notch 30. First notch 30 is an anti-slip notch that will prevent a motor grinder blade from falling off blade lift tool 10 by giving a place for a portion of the blade to sit.

FIG. 4 provides an exploded view of blade lift tool 10. As shown here, first wheel hub 22 and second wheel hub 22 are both mechanically coupled to bottom round tubing 20. Axel 38 slides through first wheel hub 22 where it is mechanically coupled to first tire 42 by first wheel retainer 44 and first wheel retainer set screw 46. Similarly, axel 38 slides through second wheel hub 22 where it is mechanically coupled to second tire 42 by second wheel retainer 44 (not shown) and second wheel retainer set screw 46 (not shown).

FIG. 5 shows first pin 28 in more detail. As noted above bottom bar square tubing 18 is mechanically coupled to first blade stop 24. First blade stop 24 comprises first hole 26. First pin 28 comprises first notch 30 and first threaded portion 32. A user mechanically couples first pin 28 to first blade stop 24 by inserting first threaded portion 32 into first hole 26 and completing the mechanical couple by using first w 34 and first nut 36 in a well-known manner. Similarly, bottom bar square tubing 18 is mechanically coupled to second blade stop 24. Second blade stop 24 comprises second hole 26. Second pin 28 comprises second notch 30 and second threaded portion 32. A user mechanically couples second pin 28 to second blade stop 24 by inserting second threaded portion 32 into second hole 26 and completing the mechanical couple by using second washer 34 and second nut 36 in a well-known manner.

To use blade lift tool 10, user 48 maneuvers blade lift tool 10 to a new motor grader blade. User 48 then tilts blade lift tool 10 to partially raise the motor grader blade. Once raised, user 48 installs first pin 28 and second pin 28 as explained in FIG. 5 which allow for easy centering and handling of the motor grader blade. To do this user 48 aligns first notch 30 against the back side of the motor grader blade and pulls back on handle 12 rotating which moves blade lift tool 10 about axel 38 until the motor grader blade is safely aligned against first notch 30 and second notch 30. User 48 can maneuver the motor grader blade to the desired location. Once at the desired location, a user can align the motor grader blade in a predetermined position and then remove first pin 28 and second pin 28 allowing the motor grader blade to fall into place. The user can then install the new motor grader blade in a manner well known in the art.

That which is claimed:

1. A blade lift tool comprising,
   A blade lift tool comprising,
   a handle mechanically coupled to a center riser; where the center riser is further mechanically coupled to a bottom round tubing; where the bottom round tubing is further mechanically coupled to a bottom bar square tubing; where the bottom bar square tubing is mechanically coupled to a first blade stop and a second blade stop;
   where the first blade stop is detachably coupled to a first pin; the second blade stop is mechanically coupled to a second pin; such that the first pin and the second pin can fit through cavities on a motor grader blade to maneuver the motor grader blade;
   where the first pin further comprises a first notch and a first threaded portion; and where the second pin further comprises a second notch and a second threaded portion allowing a user to balance the motor grader blade on the first notch and the second notch and releasing the motor grader blade from the blade lift tool by detaching the first pin and the second pin from the first blade stop and the second blade stop.

2. The blade lift tool of claim 1 further comprising:
   where the bottom round tubing is further mechanically coupled to a first wheel hub and a second wheel hub;
   an axel inserted inside the first wheel hub and the second wheel hub;
   a first wheel mechanically coupled to the axel;
   a second wheel mechanically coupled to the axel.

3. The blade lift tool of claim 1 further comprising:
   where the bottom round tubing is further mechanically coupled to a first wheel hub and a second wheel hub;
   an axel inserted inside the first wheel hub and the second wheel hub;
   a first wheel mechanically coupled to the axel by a first wheel retainer and a first wheel retainer set screw;
   a second wheel mechanically coupled to the axel by a second wheel retainer and a second wheel retainer set screw.

\* \* \* \* \*